INVENTOR
Albert Beul
BY
Michael J. Striker

July 13, 1965   A. BEUL   3,194,384
APPARATUS FOR MIXING A PLURALITY OF DIFFERENT
POURABLE PARTICULATE MATERIALS
Filed Sept. 15, 1964   3 Sheets-Sheet 3

INVENTOR
Albert Beul

BY Michael J. Striker

United States Patent Office 3,194,384
Patented July 13, 1965

3,194,384
APPARATUS FOR MIXING A PLURALITY
OF DIFFERENT POURABLE PARTICULATE
MATERIALS
Albert Beul, Offheim, near Limburg, Germany, assignor to
Limburger Eisengiesserei und Maschinenfabrik Theodor Ohl K.G., Limburg (Lahn), Germany
Filed Sept. 15, 1964, Ser. No. 396,536
12 Claims. (Cl. 198—53)

The present invention concerns an apparatus for mixing a plurality of different pourable particulate solid materials with controllable dosage of the different ingredients of the resulting mixture. More particularly the apparatus according to the invention is intended to produce mixtures in which the different ingredients constitute a predetermined percentage amount of the resulting mixture. A demand for an apparatus of this type exists in various fields of industry e.g. in the field of mixing pharmaceutical products, pigments, synthetic fertilizers, other synthetic materials, components of concrete, etc.

It is already known to the prior art to permit materials of this kind to flow from their storage containers onto a plate of sufficient size so that the respective materials can form a small pile on that plate, and to move a wiper or pusher device across the surface of the plate so that depending upon the stroke or amount of movement of this wiper or pusher a desired amount of the material piled on the plate is pushed off the plate and onto a conveyor means. In conventional apparatus of this kind all the pusher or wiper devices associated respectively with different storage containers of the various materials are moved jointly by means of a common pusher bar. In order to be able to vary the amount of movement or stroke of the individual pushers or wipers means were provided whereby such variation was made possible.

However, it has been found that known apparatus of this type are not satisfactory because of various drawbacks. One disadvantage of the conventional system as described above is that due to the use of one common pusher bar all the various storage containers for the different materials had to be arranged in one straight row because otherwise the operation of the various pushers or wipers by one common single pusher bar would have been impossible. However, it is often inconvenient if not impossible to arrange all the storage containers of a substanital number of ingredients of the desired mixture in one straight row. Another disadvantage of the conventional system is the fact that the adjustable dogs and catches by means of which the movement of the common pusher bar was transmitted to the individual wipers or pushers had to be adjusted where they were located namely at the individual storage container. However, this is in many cases inconvenient, particularly if e.g., in chemical plants comparatively large storage containers are used which may be rather far remote from each other. Finally, a substantial disadvantage of the conventional system is caused by the fact that any change in the quantity taken from one particular storage container i.e., of one ingredient of the mixture affects necessarily the total amount of mixture delivered by the apparatus per unit of time.

It is therefore one object of this invention to provide for an apparatus which avoids all the known disadvantages of the conventional apparatus.

It is another object of this invention to make it possible to disregard entirely the location of the individual storage containers or, in other words, the various distances that may exist between existing containers so that these storage containers need not be any more arranged in one straight line.

It is still another object of this invention to provide for an apparatus in which the percentage amounts of the individual ingredients can be controlled by remote control devices from one central control panel in such a manner that even when a change of percentage is effected the total amount delivered per unit of time of the desired mixture does not change.

With the above objects in view the invention includes an apparatus for mixing a plurality of different pourable particulate solid materials with controllable dosage of the different ingredients of the resulting mixture, comprising, in combination, a plurality of supply means for dispensing pourable particulate solid materials, each comprising a support plate means on which said material accumulates and wiper means reciprocatingly movable across the surface of said plate means for pushing, depending upon the length of the stroke of said wiper means, a corresponding amount of said accumulated material from said plate means; conveyor means arranged underneath each of said plate means, respectively, for receiving any material pushed by said wiper means from the respective plate means and for delivering such material to a delivery point common to all of said supply means so as to produce there a mixture of said materials; a plurality of individually controllable and adjustable drive means, each operatively connected with a different one of said wiper means, respectively, for reciprocatingly moving the latter with variable stroke over the respective plate means; and remote control means for adjusting the length of the stroke of each individual one of said drive means independently from the other drive means, whereby the dosage of the ingredients of a mixture of said materials can be adjusted to any desired percentage ratio therebetween.

The novel features which are considered as characteristic for the invention are set forth in particular in the appended claims. The invention itself, however, both as to its construction and its method of operation together with additional objects and advantages hereof, will be best understood from the following description of specific embodiments when read in connection with the accompanying drawings, in which:

Figure 1:
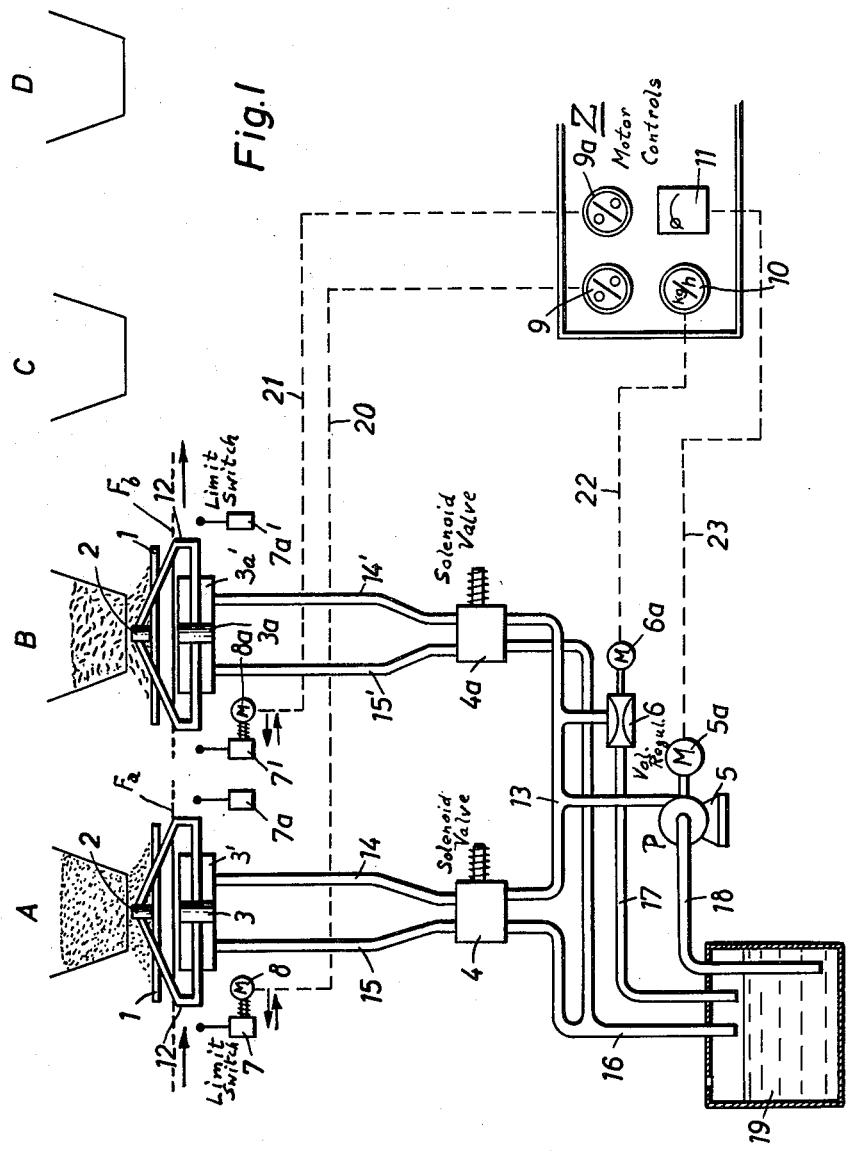
FIG. 1 is a diagrammatic illustration of an apparatus according to the invention, comprising a plurality of material supply means but illustrating in greater detail the hydraulic and electrically operable control means in reference only to two of the supply means.
Figure 2:
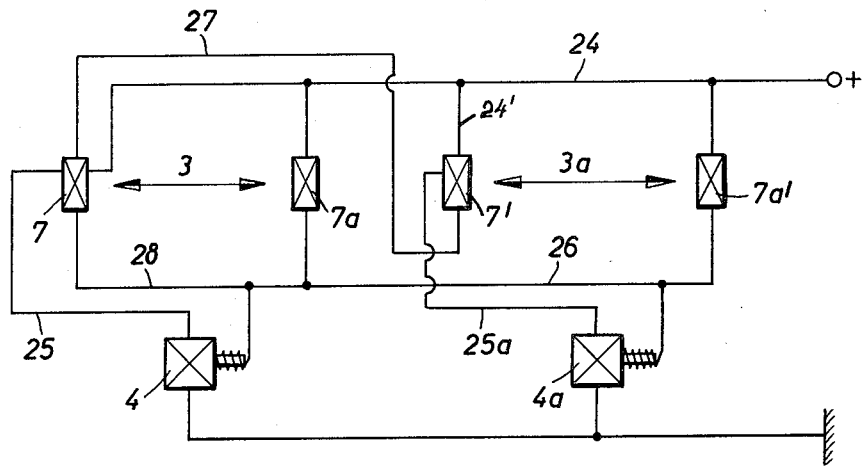
FIG. 2 is a diagrammatic illustration showing the overall structure of the electrical controls.

FIG. 1 illustrates an example of the embodiment of the invention in which four supply or storage containers A, B, C and D are shown. Of course the number of such supply containers is irrelevant and may be larger or smaller than shown. However, it is to be assumed that all the storage or supply containers of the arrangement are associated with the same type of means for distributing and mixing the various materials and the pertaining control means as is illustrated in connection with the supply and storage containers A and B. It is assumed that each of the storage containers A and B contains a substantial supply of pourable particulate solid material which in a well known manner is released from a bottom opening of the particular storage container so that it flows out and forms a pile of material as illustrated on a plate 1 arranged underneath the particular container. It is to be understood that the size of the plate 1, which may be preferably circular, is so chosen that the conical pile of material will not by itself extend or tend to extend beyond the edges of the plate. There is provided a wiper or pusher bar 2 movable across the top surface of the plate 1 and extending through the pile of material sitting on the plate, this wiper 2 being shown in FIG. 1 in end view in a diagrammatic manner.

Figure 3:
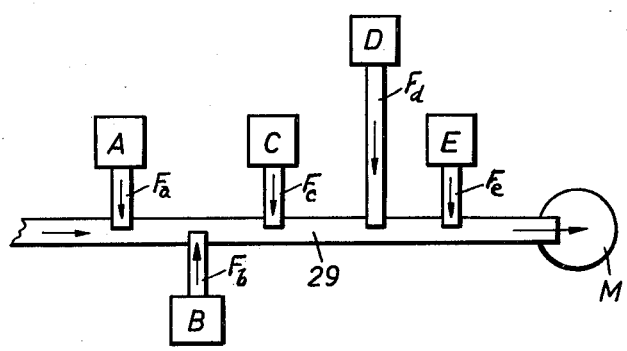
FIG. 3 is a diagrammatic plan view of an apparatus according to the invention comprising a plurality of different and irregularly located supply means cooperating with one common conveyor means delivering the components of the mixture to a delivery point.

It will be understood that if the wiper 2 is caused to move reciprocatingly over the surface of the plate 1, a certain amount of the piled up material will be pushed over the opposite edges of the plate 1, the amount depending upon the magnitude of the stroke of the wiper 2. The means for moving the wipers 2 will be described further below. However, it is to be understood that underneath each of the plates 1 a conveyor of conventional type e.g. as indicated diagrammatically at $F_a$ and $F_b$, and as also shown in FIG. 3, is arranged so that the material which is pushed by the respective wiper 2 over the edges of the plate 1 will automatically drop onto the respectively associated conveyor and carried away from the location of the plate 1 toward a delivery point. Details thereof will also be described further below.

For moving the individual wipers 2 in each case a cylinder-and-piston combination is provided comprising as diagrammatically illustrated in a piston 3 removable reciprocatingly within a cylinder 3' as far as the unit comprising the supply and storage container A is concerned. The piston 3 or rather the pertaining piston rods are connected by suitable brackets or braces 12 as illustrated with the respective wiper 2. The wiper will make reciprocating movements exactly in accordance with the movements of the piston 3. For moving the piston 3 within its cylinder 3' hydraulic means are provided as illustrated and these hydraulic means are controlled by a limit switch 7 on one end of the path of the piston bracket 12 and another limit switch 7a at the opposite end of this path. The hydraulic system for the above described equipment comprises a solenoid valve 4 as will be described further below. This valve is controlled by the limit switches 7 and 7a. When the wiper 2 reaches the end of its stroke toward the left as seen in the drawing due to the movement of the piston 3 in this direction the limit switch 7 will be actuated and will cause the solenoid valve 4 to switch the connections in the hydraulic circuit so that the movement of the piston 3 and thus also that of the wiper 2 is reversed into the opposite direction until at the end of a predetermined length of the stroke the limit switch 7a is operated whereby again the solenoid valve 4 is actuated so as to reverse the piston and wiper movement into the first direction. However, it is important to note the fact that the location of at least one of the limit switches namely the limit swich 7 is adjustable e.g. by means of a remote control motor 8 which may operate in conventional manner a threaded spindle carrying a nut attached to the switch 7 so that depending upon the operation of the control motor 8 the length of the stroke of the piston 3 and thus of the wiper 2 at least in the direction to the left can be freely predetermined and varied.

The hydraulic system comprises also a pump 5 driven by a motor 5a and a storage tank 19 for the hydraulic fluid. When the pump 5 is in operation it will pump fluid from the tank 19 through an intake pipe 18 and into a feeder 13 into the intake port of the valve 4. Provided that the valve is in its first position as described further below the fluid will be further delivered through the pipe 14 into one portion of the cylinder 3' so that now the piston 3 is moved toward the left while the fluid from the left portion of the cylinder is returned through the pipe 15 and the valve 4 into the return flow pipe 16. Of course, when the valve 4 is in another position as will be described below the flow of the fluid is changed and the fluid from the feeder pipe 13 is caused to flow through the pipe 15 into the lefthand portion of the cylinder 3' so as to push the piston 3 in the opposite direction while the fluid from the righthand portion of the cylinder 3' is permitted to return through the pipe 14 and through the valve 4 again into the return pipe 16. However, the pipe 13 is also connected with a conventional delivery volume regulator 6 through which a predetermined amount of the fluid is permitted to return from the above-described hydraulic circuit system through a return pipe 17 to the storage tank 19. As is well known the regulators 6 can be adjusted in such a manner that the amount of fluid delivered per unit of time into the system described above can be varied within predetermined limits. It may be added that the volume control or regulating device 6 may be adjusted by a remote control motor 6a as will be described further below.

As will be readily understood the operating system of the second illustrated unit associated with the storage container B is absolutely identical with the system described above and the components 3a and 3a', 7', 7a', 8a, 4a, 14' and 15' are identical with the above described components 3, 3', 7, 7a, 8, 14, 15 and 4.

In order to better understand the operation reference is now made to FIGS. 2a, 4, 4a and 4b. It is to be understood that the limit switches 7, 7a and the solenoid valves 4 may be of entirely conventional type and thus may even differ from the type described further below with reference to the drawing since the drawing only illustrates examples that function and operate in accordance with the well known operation of similar components of hydraulic and electric equipment.

Figure 4:
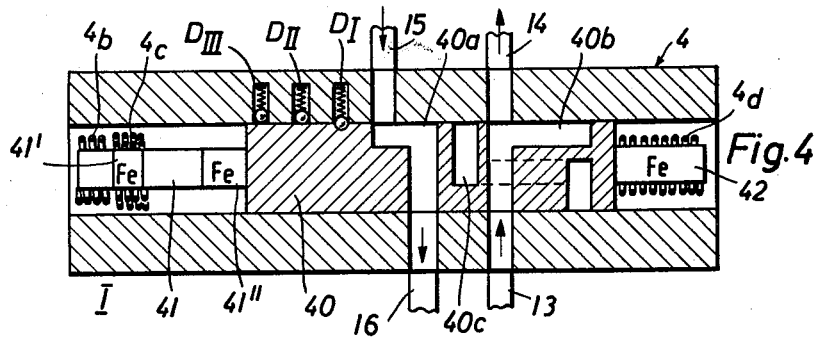
FIG. 4 illustrates diagrammatically in axial section an electrically operable control valve as used in the arrangement used according to FIGS. 1 and 2a, and FIGS. 4a and 4b illustrate diagrammatically the essential portions of the valve according to FIG. 4 in positions different from the one position illustrated in FIG. 4.

The solenoid valves 4, 4a may be preferably a four-way valve having four ports where the valve 4 according to FIG. 4 is connected with the above-mentioned pipes 13, 14, 15 and 16. A valve member 40 is longitudinally movable within a cylindrical bore of the valve housing 4. Valve member 40 is provided with 3 distinct channels 40a, 40b and 40c as illustrated. In the position I illustrated by FIG. 4 the pipes 13 and 14 are connected with each other by the channel 40b while the pipes 15 and 16 are connected with each other by the channel 40a. Consequently the fluid is free to flow in the direction indicated by the arrows in FIG. 4. The third channel 40b is not in operation when the valve is in position I.

Figures 4A, 4B:
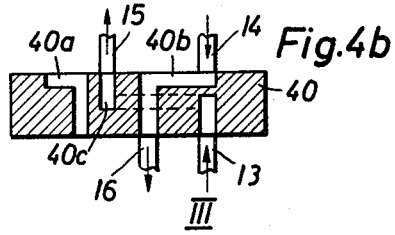

The valve can be moved between three positions and in each position the valve member 40 may be arrested by suitably spaced conventional arresting means $D_1$ and $D_2$ and $D_3$ which may consist of a ball loaded by a spring and adapted to drop into a corresponding recess on the circumference of the valve member 40. It is easy to understand that when the valve member 40 is moved to position II as illustrated by FIG. 4a no connection is operative between the pipes 13, 14 and 15, 16. The channel 40c is still out of operation. However when the valve member 40 is moved into position III as illustrated by FIG. 4b, the pipe 13 is connected by channel 40c with the pipe 15 while the pipe 14 is connected by channel 40b with the pipe 16 so that now the flow of fluid is reversed. In this case the channel 40a is entirely inoperative.

In order to move the valve member 40 between positions I, II and III solenoid means are provided as illustrated. For this purpose the member 40 is provided at each end with a stem 41 and 42, respectively. The stem 41 is surrounded by two independent solenoid windings 4b and 4c while the stem 42 is similarly surrounded by a solenoid winding 4d. The windings are of course stationarily mounted within the above-mentioned bore of the valve body 4. The stem 42 may consist entirely of magnetic material while the stem 41 is partly of non-magnetic material but contains portion 41' and 41'' of magnetizable material. It will therefore be understood that energization of any one of the solenoid windings 4b, 4c, or 4d, respectively, will cause longitudinal movement of the valve member 40 as will be described now. Assuming that the valve member 40 is in its position I as illustrated by FIG. 4, energization of the solenoid winding 4b will result in attracting the ferromagnetic portion 41' so that the valve member 40 will make a movement toward the left until the portion 41' is completely surrounded by the winding 4b and the detent $D_{II}$ engages the corresponding recess in the member 40. In this manner the position II as illustrated by FIG. 4a is reached. Consequently at this moment the flow of fluid through the valve 4 is entirely interrupted. If now additionally the second solenoid winding 4c is energized the ferromagnetic portion 41" will be moved from its position II back to position I as out a further step toward the left until the portion 41" is surrounded by the winding 4c and the detent $D_{III}$ engages the above-mentioned recess in the member 40. Thus the position III as illustrated by FIG. 4b is reached whereby the flow of the fluid is reversed as compared to the direction of flow controlled by the position I. It will be understood by the winding 4c should be more powerful than the neighboring winding 4b so that even if the latter is energized the power exerted by energization of the winding 4c will overcome the magnetic action of the winding 4b on the portion 41' of the stem 41.

When thereafter as will be described below, the windings 4b and 4c are de-energized and it is desired to move the valve member 40 again back to position I then it is only necessary to energize the third solenoid winding 4d whereby the ferromagnetic stem portion 42 will be attracted and in this manner the entire valve member 40 will be moved from its position III back to position I as illustrated by FIG. 4.

Figure 2A:
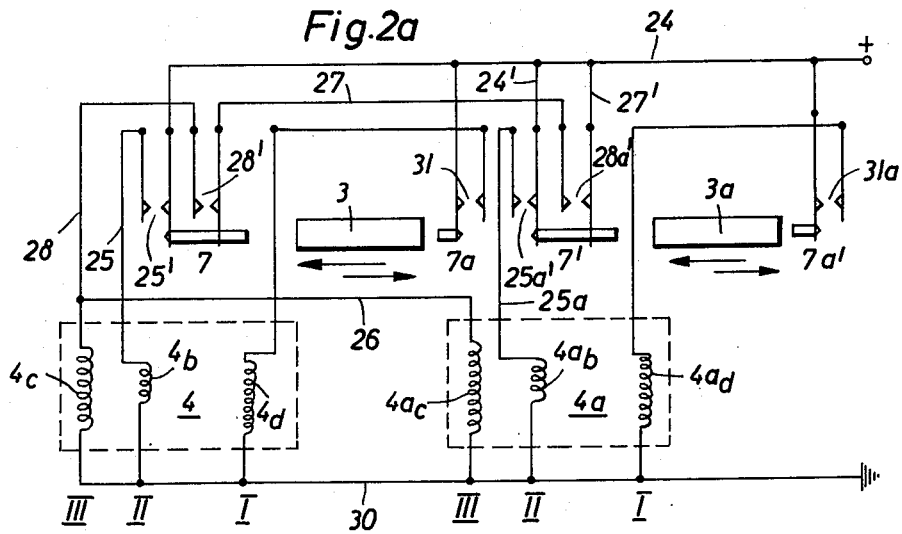
FIG. 2a shows by way of example a circuit diagram of the electric controls of the apparatus according to FIG. 1.

In FIG. 2a the reciprocating pistons 3 and 3a as well as the corresponding valves 4 and 4a are shown diagrammatically. In addition FIG. 2a illustrates by way of example the electrical controls comprising the limit switches 7, 7a, and 7' and 7a' cooperating with the above-described solenoid windings in the valves 4 and 4a, respectively. As can be seen the limit switches 7 and 7' comprise each two pairs of contacts 25', 28' and 25a' and 28a', respectively. On the other hand, the limit switches 7a and 7a' comprise only a single pair of normally open contacts 31 and 31a, respectively. Between the power supply lines 24 and 30 carrying positive and ground potential, respectively, the windings 4c, 4b and 4d of valve 4 and the corresponding windings $4a_c$, $4a_b$, $4a_d$ of valve 4a and the corresponding contacts of the limit switches are connected as illustrated by FIG. 2a.

It can be understood readily that if the piston 3 or the piston 3a move from position I toward the left a predetermined amount which depends upon the adjusted location of the respective switches 7 and 7' there will be a moment when the piston 3 or rather the corresponding bracket 12 or a portion of the piston rod engages the illustrated insulated portion of the contact assembly of the respective limit switch, and the pair of normally open contacts 25', 28' or 25a' and 28a', respectively, will be moved to engaged position whereby first of all a circuit between supply line 24 and the corresponding winding 4b or $4a_b$, respectively, and the return conductor 30 will be closed. Consequently, the valve which is associated with the piston which has completed its determined stroke will be moved to position II so that further movement of that respective piston will be stopped. In the limit switch 7 or 7', which ever has been actuated by the corresponding piston movement, also the contact pair 28' or 28a' has been moved to closed position. However, it can be seen that the winding 4c and $4a_c$ of the valves 4 and 4a, respectively, are connected in parallel with each other by the connect line 26 and that this parallel combination is connected by line 28 to the contact pair 28' of limit switch 7 and this pair of contacts is connected via line 27 in series with the corresponding pair of contacts 28a' of the limit switch 7' and thereafter with line 24. Thus it can be seen that the closing of the individual contact pairs 28' and 28a' (and whichever additional similar contacts in additional limit switches may be existing in the apparatus) remains without effect until all the pistons 3, 3a etc., have reached their end of stroke i.e. have actuated the respective limit switches, 7, 7' at the lefthand end of the stroke. Only then all the windings 4c, $4a_c$, etc. of the valves 4, 4a, etc. are simultaneously energized, and consequently all the valves assume the position III whereby the movement of the respective pistons or rather of all the pistons in the arrangement is reversed and the pistons are caused to move in opposite direction toward the right as seen in the drawing. At the end of the predetermined length of this return stroke each of the pistons 3, 3a, etc. or rather the corresponding bracket 12 or the respective piston rod abut against the switch 7a, 7a', etc., respectively, whereby the various circuits for the solenoid windings 4d, $4a_d$, etc. are closed by the closing of the contact pairs 31, 31a, etc. Hereby the valve members 40 of all the valves are returned toward position I whereby the corresponding pistons are again caused to start their stroke toward the left and in this manner the whole cycle repeats.

Of course, it is to be understood that if there are more units, i.e. a greater number of limit switches 7', 7, etc. at the lefthand end of the stroke of the respective distance, then of course the connection 27' illustrated in FIG. 2a will not be taken from the contact pair 28' directly to the line 24 but will be connected in the same manner as is shown by the line 27, to the next following limit switch and in this manner all the lefthand limit switches or rather second pairs of contacts corresponding to the pair 28' will be all connected in series with each other.

It will be understood now that the entire operation is fully automatic and will produce repeated delivery of predetermined amounts of materials (depending upon the adjusted length of the strokes of the wipers 2) from the individual containers A, B, C, D, etc. to the respective conveyer means Fa, Fb, Fc, Fd, etc. as long as the pump 5 is kept in operation. Since the pump 5 is driven by a motor 5a the operation of the latter can be started and stopped from a main switch or starter 11 arranged on a main control panel Z and connected with the motor 5a by a line 23. The above-mentioned volumetric regulator 6 is adjustable by means of a motor 6a which is connected by a line 22 to a remote control setting device 10 which is also on the main control panel Z. This remote control setting device 10 may be calibrated in terms of delivery of pressure fluid per hour (e.g., kg./h.) so that by suitable setting of this instrument 10 and corresponding adjustment of the regulator 6 the quantity of pressure fluid flowing in the hydraulic system can be determined as may be desired. Accordingly with greater fluid delivery the pistons 3, 3a, etc. will travel faster without their stroke lengths being affected, and with a smaller supply of pressure fluid the speed of the pistons will be reduced.

As mentioned above, the location of the lefthand limit switches 7, 7', etc. relative to the respective cylinder-and-piston arrangement is adjustable by remote control through operation of a corresponding motor 8, 8a, respectively. These motors are connected by lines 20 and 21, respectively, to corresponding remote control setting devices 9 and 9a, respectively. The setting devices 9 and 9a may be calibrated in terms of percentages i.e. in such a manner that the strokes of the wipers 2 of the different supply units and consequently the amount of material contributed by the different supply units can be predetermined in terms of a certain percentage relative to the total amount of the mixture to be produced. It should be understood that the motors 8, 8a and 6a as well as the corresponding setting devices 9, 9a and 10 may be conventional selsyn or synchro arrangements so that the control motors can be moved into any desired positions by correspondingly moving the respective setting device into a desired position.

The mixing procedure and the control of the dosage of the various ingredients of the desired mixture is effected as follows. It is clear that under equal conditions, i.e. if the limit switches 7, 7' etc. on the lefthand side of the respective cylinder-and-piston arrangements are all set to the same relative position, then the strokes of the wipers 2 of all the supply devices will be equal to each other and consequently equal amounts of all the materials furnished by the supply or storage containers A, B, C, D, etc. will be equal. However, if the mixture should contain different percentages of the different ingredients then it is only necessary to correspondingly adjust the location of the various limit switches at the lefthand end of the piston strokes. For instance if the materials furnished by the supply containers A, B should appear in the final mixture in a proportion 3:7, then it is evident that by setting the setting devices 9 and 9a to 30% and 70% positions respectively, the limit switch 7 will be moved to a position closer to the cylinder 3' than the limit switch 7' would be set relative to the cylinder 3a'. If now the pump 5 is started to operate the above-described cycle of operations will start and during this cycle of operations the piston 3 will make strokes toward the left up to a predetermined limited length and stop upon completion of that stroke until the piston 3a will have carried out its longer stroke and when this longer stroke is completed so that the contacts 28' and 28a' of the limit switches 7, 7' respectively, are both closed, then both pistons 3 and 3a will return to their extreme righthand position so as to actuate the switches 7 and 7a' whereafter again the cycle begins and both pistons together with their wipers 2 will carry out their strokes to the left of different lengths. Consequently the material from A will be wiped onto the conveyor Fa in the proportion 3:7 with respect to the material from the container B which is wiped onto the respective conveyor Fb. If there are in the apparatus or plant a greater number of material containers and a corresponding greater number of pistons and wipers evidently the operation would be still the same except that each individual piston stroke on each unit will be adjusted in the desired proportion which is to be arrived at in putting through the desired mixture of the various materials.

It is to be stressed that in the arrangement as described above the total amount of material delivered by the above-mentioned conveyers during a given period of time to a desired delivery point where by the final mixture is carried out will not change as long as the regulator 6 is left in a certain adjustment, even if during the operation the adjustment of the various lefthand limit switches is changed and thus the percentage amounts of the various ingredients are changed. This will be understood from the following examination. It may be assumed that for instance the limit switch 7 is moved to its extreme position toward the right whereby the stroke of the piston 3 from its illustrated central position toward the left is reduced to zero. Now one might believe that hereby the total amount of material that will be delivered by the entire arrangement to the delivery point will be reduced because one-half of the material that can be delivered thereto from the container A would be eliminated from the delivery. However, this is not the case because in the entire hydraulic circuit always a predetermined fixed amount of pressure fluid is circulating. Since now the piston 3 can carry out only a stroke of one-half of its total length one-half of the total quantity of pressure fluid that could fill the cylinder 3' is distributed among the other cylinders so that their pistons, respectively, will move faster, this speed increase corresponding to the amount of pressure fluid which cannot circulate through the cylinder 3'. Consequently in the entire apparatus a constant uniform of amount of materials would be handled and delivered to the delivery point although the percentage amounts of the ingredients may have been changed.

Referring now to FIG. 3 it can be seen for instance that an arrangement comprising five storage containers A–E may be arranged in irregular relative locations and at different distances from each other as may be required. From each of these containers A–E a separate contributory conveyor of conventional type Fa–Fe, respectively, would then deliver the different materials onto a main conveyor 29 on which then all the different materials are collected and delivered to a common delivery point which may be a mixer M.

It should be borne in mind that an apparatus for mixing a plurality of different materials as described and as constituting the present invention can be used for a great variety of different materials. It may be used for mixing pharmaceutical products in which case probably the storage containers would have a size capable of storing only a few pounds of the ingredients and in which case the hydraulic cylinders would have the size of only a cubic inch or of this order. However, without changing the basic conception of the invention the same principle may be incorporated in arrangements of much larger size, for instance for the purposes mentioned at the outset of the specification in which the storage containers may accommodate several tons of materials and in which case the hydraulic system of course would have to be constructed to handle comparatively large quantities of pressure fluid.

It is essential and characteristic of the invention that in all cases of its application the dosage of the different ingredients can be controlled for automatic operation and preferably can be controlled directly in percentages from a common control panel. In addition, irrespective of changes of the percentage relations between the various ingredients the total amount of material delivered to the mixing point remains constant unless arbitrarily and intentionally the speed of operation is changed e.g. by the control of the regulator 6 described above. This last-mentioned fact that the total amount of delivery can be kept constant and at a predetermined and adjustable magnitude may in many cases be of great importance particularly if the mixer arrangement has a certain capacity or if other processing machines are to be supplied by the mixing apparatus, e.g. tablet compressing machines or packing machines.

It will be understood that each of the elements described above or two or more together, may also find a useful application in other types of apparatus for mixing a plurality of different particulate materials differing from the types described above.

While the invention has been illustrated and described as embodied in an apparatus for mixing a plurality of different particulate materials with a controllable dosage of the different ingredients of the resulting mixture, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations are intended to be comprehended within the meaning and range of equivalence of the following claims.

What is claimed and desired to be secured by Letters Patent is:

1. Apparatus for mixing a plurality of different pourable particulate solid materials with controllable dosage of the different ingredients of the resulting mixture, comprising, in combination, a plurality of supply means for dispensing pourable particulate solid materials, each comprising a support plate means on which said material accumulates and wiper means reciprocatingly movable across the surface of said plate means for pushing, depending upon the length of the stroke of said wiper means, a corresponding amount of said accumulated material from said plate means; conveyor means arranged underneath each of said plate means, respectively, for receiving any material pushed by said wiper means from the respective plate means and for delivering such material to a delivery point common to all of said supply means so as to produce there a mixture of said materials; a plurality of individually controllable and adjustable drive means, each operatively connected with a different one of said wiper means, respectively, for reciprocatingly moving the latter with variable stroke over the respective plate means; and remote control means for adjusting the length of the stroke of each individual one of said drive means independently from the other drive means, whereby the dosage of the ingredients of a mixture of said materials can be adjusted to any desired percentage ratio therebetween.

2. An apparatus according to claim 1, wherein said conveyor means comprise a plurality of first conveyor means respectively associated and cooperating with said plurality of supply means, and a main conveyor means arranged for receiving individually from each of said plurality of first conveyor means said different materials carried thereby, said main conveyor means delivering all of said different materials to a predetermined point of delivery.

3. Apparatus for mixing a plurality of different pourable particulate solid materials with controllable dosage of the different ingredients of the resulting mixture, comprising, in combination, a plurality of supply means for dispensing pourable particulate solid materials, each comprising a support plate means on which said material accumulates and wiper means reciprocatingly movable across the surface of said plate means for pushing, depending upon the length of the stroke of said wiper means, a corresponding amount of said accumulated material from said plate means; conveyor means arranged underneath each of said plate means, respectively, for receiving any material pushed by said wiper means from the respective plate means and for delivering such material to a delivery point common to all of said supply means so as to produce there a mixture of said materials; drive means for imparting reciprocating movement to said wiper means and comprising a plurality of hydraulic motor means, each operatively connected with a different one of said wiper means and capable of producing reciprocating motion, pump means common to all of said hydraulic motor means for circulating pressure fluid therethrough, and hydraulic circuit means connecting said pump means with said individual hydraulic motor means and including individual control valve means between said pump means and said hydraulic motor means, respectively, for controlling the motion produced by the respective hydraulic motor means; at least partly adjustable control means individually connected operatively with said hydraulic motors, respectively, for limiting the stroke length of said reciprocating motion thereof to an adjustable amount and for controlling said control valve means so as to cause reversal of said motion when a stroke has been completed; and remote control means for adjusting said adjustable control means of each of said drive means individually so as to determine thereby the desired length of the stroke of the respectively connected hydraulic motor means, whereby the dosage of the ingredients of a mixture of said materials can be adjusted to any desired percentage ratio therebetween.

4. Apparatus for mixing a plurality of different pourable particulate solid materials with controllable dosage of the different ingredients of the resulting mixture, comprising, in combination, a plurality of supply means for dispensing pourable particulate solid materials, each comprising a support plate means on which said material accumulates and wiper means reciprocatingly movable across the surface of said plate means for pushing, depending upon the length of the stroke of said wiper means, a corresponding amount of said accumulated material from said plate means; conveyor means arranged underneath each of said plate means, respectively, for receiving any material pushed by said wiper means from the respective plate means and for delivering such material to a delivery point common to all of said supply means so as to produce there a mixture of said materials; drive means for imparting reciprocating movement to said wiper means and comprising a plurality of hydraulic cylinder-and-piston combinations, each operatively connected with a different one of said wiper means and capable of producing reciprocating motion of the respective piston, pump means common to all of said hydraulic cylinder-and-piston combinations for circulating pressure fluid therethrough, and hydraulic circuit means connecting said pump means with said individual hydraulic cylinder-and-piston combinations and including individual electrically controllable control valve means between said pump means and said hydraulic cylinder-and-piston combinations, respectively, for controlling the motion of the respective piston produced by the respective hydraulic cylinder; at least partly adjustable limit switch means individually actuatable by the movement of said pistons, respectively, for limiting the stroke length of said reciprocating motion thereof to an adjustable amount by controlling said control valve means so as to cause reversal of said motion when a stroke has been completed; and remote control means for adjusting the position of individual ones of said adjustable limit switch means of each of said drive means individually so as to determine thereby the desired length of the stroke of the piston of the respectively connected hydraulic cylinder-and-piston combinations, whereby the dosage of the ingredients of a mixture of said materials can be adjusted to any desired percentage ratio therebetween.

5. An apparatus according to claim 4 wherein said remote control means include for each of said adjustable limit switch means an electromotor operable by remote control so as to position the respective limit switch means to a variety of selectable positions relative to the path of the respective piston.

6. Apparatus for mixing a plurality of different pourable particulate solid materials with controllable dosage of the different ingredients of the resulting mixture, comprising, in combination, a plurality of supply means for dispensing pourable particulate solid materials, each comprising a support plate means on which said material accumulates and wiper means reciprocatingly movable across the surface of said plate means for pushing, depending upon the length of the stroke of said wiper means, a corresponding amount of said accumulated material from said plate means; conveyor means arranged underneath each of said plate means, respectively, for receiving any material pushed by said wiper means from the respective plate means and for delivering such material to a delivery point common to all of said supply means so as to produce there a mixture of said materials; drive means for imparting reciprocating movement to said wiper means and comprising a plurality of hydraulic cylinder-and-piston combinations, each operatively connected with a different one of said wiper means and capable of producing reciprocating motion of the respective piston, pump means common to all of said hydraulic cylinder-and-piston combinations for circulating pressure fluid therethrough, and hydraulic circuit means connecting said pump means with said individual hydraulic cylinder-and-piston combinations and including valve means for adjusting the total volumetric delivery of said fluid into said hydraulic circuit means to a predetermined amount and including individually electrically controllable control valve means between said pump means and said hydraulic cylinder-and-piston combinations, respectively, for controlling the motion of the respective piston produced by the respective hydraulic cylinder between standstill, movement in one direction and movement in the opposite direction; at least partly adjustable limit switch means individually actuatable by the movement of said pistons, respectively, for limiting the stroke length of said reciprocating motion thereof to an adjustable amount by controlling said control valve means so as to cause reversal of said motion when a stroke has been completed; and remote control means for adjusting the position of individual ones of said adjustable limit switch means of each of said drive means individually so as to determine thereby the desired length of the stroke of the piston of the respectively connected hydraulic cylinder-and-piston combinations, whereby the dosage of the ingredients of a mixture of said materials can be adjusted to any desired percentage ratio therebetween.

7. An apparatus according to claim 6, wherein said control valve means comprise electromagnetic means for being electrically movable between three positions corresponding to said three conditions of movement of the respective piston, and wherein each of said limit switch means is so connected with said electromagnetic means of the respectively associated valve means that when the respective piston has completed a stroke of predetermined length in a first direction the respective valve means is moved into a position in which the respective piston is caused to stand still, and that when all of said pistons have completed a stroke of the respective predetermined length in said first direction all of said valve means are caused to assume a position which causes movement of all of said pistons in opposite direction, and that when any of said pistons has completed a stroke of the respectively predetermined length in said opposite direction the respective valve is moved to the position which causes reversal of the movement of the respective piston into said first direction.

8. An apparatus according to claim 7, wherein each of said hydraulic control valve means is an electrically operable four-way valve means movable between a first position which establishes connection for fluid supply to the respective cylinder-and-piston combinations for moving its piston in a first direction and connection for return flow to said pump means, a second position in which the fluid flow is interrupted, and a third position establishing connection for fluid supply and return flow for moving said piston in opposite direction, said valve means including a combination of electromagnetic means selectively energizable for causing said valve means to assume any desired one of said three positions, and wherein each of said limit switch means associated with a particular cylinder-and-piston combination includes a first limit switch device having a first pair of normally open contacts connected in circuit with that portion of said electromagnetic means which causes upon its energization said valve means to assume said first position, and a second pair of normally open contacts connected in circuit with that portion of said electromagnetic means which causes upon its energization said valve means to assume said second position, said first limit switch device being located for having said two pairs of contacts moved to closed position when said piston has carried out a stroke of predetermined length in said first direction, and wherein each of said limit switch means associated with said particular cylinder-and-piston combination includes a second limit switch device having a pair of normally open contacts connected in circuit with that portion of said electromagnetic means which causes upon its energization said valve means to assume said third position, said second limit switch device being located for having its pair of contacts moved to closed position when said piston has carried out a stroke of predetermined length in said opposite direction, said second pairs of normally open contacts of all of said first limit switch devices of all of said limit switch means being connected in series with each other so that irrespective of different adjusted locations of said first limit switch devices and of the resulting different stroke length of the respective pistons the reversal of movement therefrom said first direction to said opposite direction will be caused simultaneously for all of said pistons when the latter have all completed their respectively predetermined length of stroke.

9. An apparatus according to claim 8 wherein said remote control means include for each of said adjustable limit switch means an electromotor operable by remote control so as to postion the respective limit switch means to a variety of selectable positions relative to the path of the respective piston, and including remote control motor means for adjusting said valve means for adjusting the total volumetric delivery of said pump means.

10. An apparatus according to claim 9, including remote control setting means cooperating respectively with each of said remote control electromotors and calibrated in terms of percentage of the respective ingredients furnished by the respective supply means for the desired mixture, and remote control setting means cooperating with said control motor means and calibrated in terms of weight per unit of time, and motor control means for operating said pump means, all of said remote control setting means and said motor control means being arranged as a control assembly at a predetermined distance from said plurality of supply means.

11. An apparatus according to claim 6 wherein said remote control means include for each of said adjustable limit switch means an electromotor operable by remote control so as to position the respective limit switch means to a variety of selectable positions relative to the path of the respective piston.

12. An apparatus according to claim 6 wherein said remote control means include for each of said adjustable limit switch means an electromotor operable by remote control so as to position the respective limit switch means to a variety of selectable positions relative to the path of the respective piston, and including remote control motor means for adjusting said valve means for adjusting the total volumetric delivery of said pump means.

No references cited.

SAMUEL F. COLEMAN, *Primary Examiner.*